United States Patent [19]
Viger, Jr.

[11] 3,746,878
[45] July 17, 1973

[54] STANDBY POWER SOURCE FOR AN AC ALARM SYSTEM

[75] Inventor: George P. Viger, Jr., Commack, N.Y.

[73] Assignee: Signal Communications, Inc., East Northport, N.Y.

[22] Filed: Mar. 15, 1972

[21] Appl. No.: 234,906

[52] U.S. Cl. .................................. 307/66, 340/276
[51] Int. Cl. .............................................. H02j 7/00
[58] Field of Search ................ 307/66, 64; 340/276

[56] References Cited
UNITED STATES PATENTS
3,614,461  10/1971  Speer .................................... 307/66
3,348,060  10/1967  Jamieson .............................. 307/66
3,609,506  9/1971   Frezzolini et al. ..................... 307/66

Primary Examiner—Herman J. Hohauser
Attorney—Sylvester J. Liddy, Charles E. Baxley et al.

[57] ABSTRACT

A standby power source connected to AC power mains for supplying AC power to an AC alarm system when there is a main power failure comprises a source of DC power, inverter means for converting DC power to AC power and controlled switching means for connecting the source of DC power to the inverter means and for transferring the connection of the AC alarm system from the AC power mains to the inverter means at the time of a power failure.

2 Claims, 3 Drawing Figures

Patented July 17, 1973 3,746,878
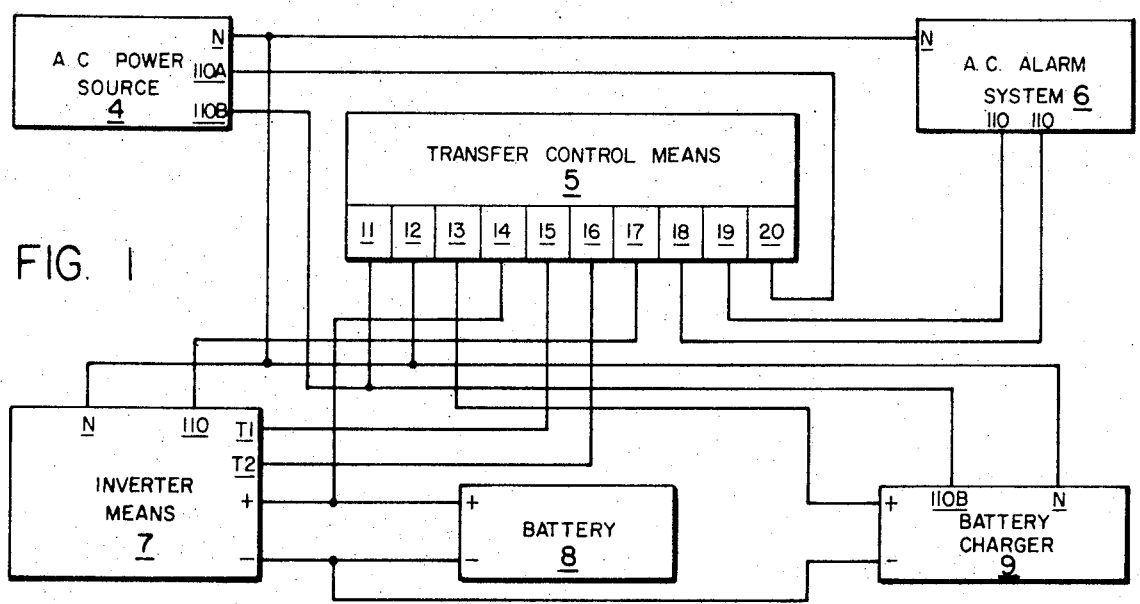
FIG. 1
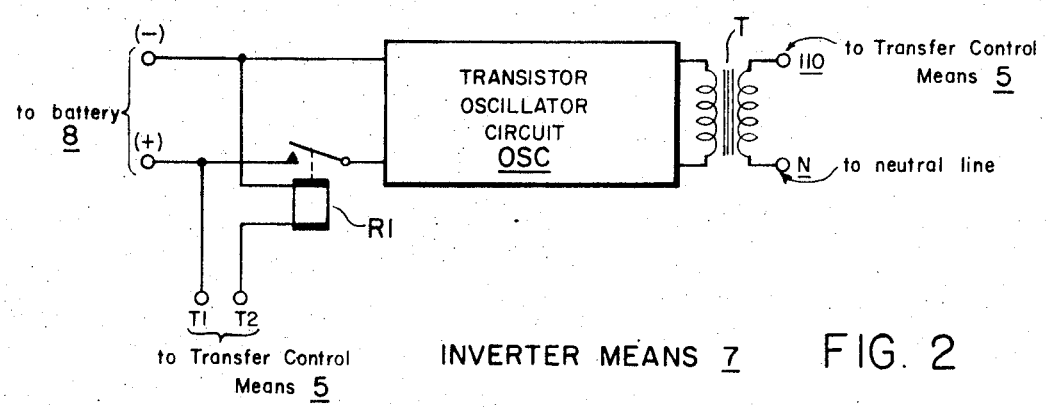
INVERTER MEANS 7     FIG. 2
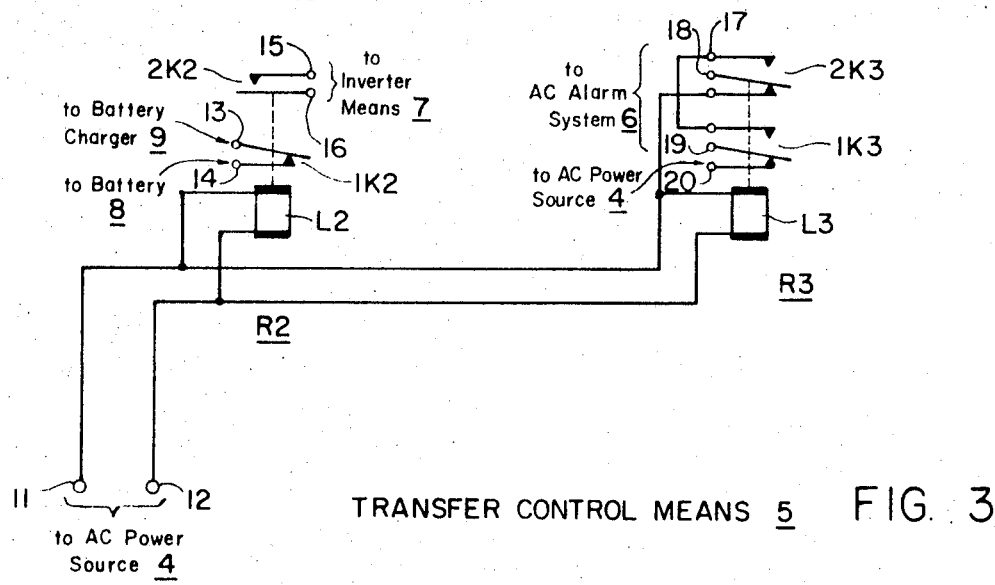
TRANSFER CONTROL MEANS 5     FIG. 3

STANDBY POWER SOURCE FOR AN AC ALARM SYSTEM

This invention pertains to standby power sources and more particularly to such sources for supplying an alarm system.

Many local fire alarm systems used in schools, hospitals and the like are AC systems wherein the components such as bells, sensors and magnetic door releases rely on AC power.

Lately because of the prevalence of power failures, brownouts and the like, it has become apparent that reliably operating AC alarm systems require a standby source of power. In fact, some states now require such standby sources in schools and similar institutions. Accordingly, many users are adding motor-generator sets to supply the standby power. While such sets can perform this function they have several drawbacks. The sets incorporate internal combustion engines which utilize gasoline or other hydrocarbons as their fuel source. Therefore, not only are the problems associated with the storage of such combustible fluids present but also there are pollution problems associated with the fumes produced by the internal combustion engines. Furthermore, because of the inertia in such generators, there is a lapse in time from the time the generator is signaled, generally by the sensing of a power failure, and the time the generator delivers its rated output. Accordingly, it is possible for the system to transmit a false alarm due to relays dropping out during the time lapse.

It is accordingly a general object of the invention to provide an improved standby power source for AC alarm systems.

It is another object of the system to provide such a power source which does not have the problems associated with motor-generator sets.

It is a further object of the invention to provide such a power source which while satisfying the above-mentioned objects is compact and requires a minimum of service, repair and maintenance.

Briefly, the invention contemplates apparatus connected to AC power mains for supplying power to an AC alarm system when there is a failure of power from the AC power mains. The apparatus comprises a source of DC power and inverter means for converting DC power to AC power. There is a first switching means for connecting the source of DC power to the inverter means, and a second switching means for transferring the connection of the AC alarm system from the AC power mains to the inverter means. The switching means are activated when there is a failure of power from the AC power mains.

Other objects, the features and advantages of the invention will be apparent from the following detailed description when read with the accompanying drawing which shows, by way of example, and not limitation a presently preferred embodiment of the invention.

In the drawing:

FIG. 1 is a block diagram of an AC alarm system being powered by AC power mains and with a standby power source in accordance with the invention;

FIG. 2 is a schematic diagram of the inverter means of FIG. 1; and

FIG. 3 is a schematic diagram of the transfer control means of FIG. 1.

In FIG. 1 there is shown apparatus according to the invention wherein an AC alarm system 6 is connected either to AC power source 4 or a standby AC power supply including inverter 7, battery 8 and battery charger 9 under the control of transfer control means 5.

The operation of the apparatus is such that as long as source 4 delivers AC power, AC alarm system 6 receives its power from source 4 and battery charger 9 receives power from source 4 to "trickle"-charge battery 8. When there is a failure of power from source 4, transfer control means 5 senses such failure and switches the connection of AC alarm system 6 from source 4 to the output of inverter means 7. At the same time transfer control means 5 causes the actuation of inverter means 7 and disconnects battery charger 9 from battery 8 to prevent a needles drain on the battery. Then DC power accumulated in battery 8 is converted to AC power by inverter means 7 to power the AC alarm system 6 until the power failure is corrected.

When AC power is restored and its restoration sensed by transfer control means 5, AC power source 4 is reconnected to AC alarm system 6 and inverter means 7 deactivated under the control of transfer control means 5. Simultaneously battery charger 9 is reconnected to battery 8 to fast charge the latter to full charge and thereafter furnish a trickle charge.

The elements of the apparatus will now be described.

AS power source 4 is the conventional public utility lines furnishing at terminals 110 A and 110 B two different phases of AC power with respect to neutral terminal N.

AC alarm system 6 can be a conventional fire alarm system or the like having bells, gongs, door release devices, etc., all operated by AC power received at its terminals 110. The neutral of the system is connected to neutral terminal N and, via a line, to a similar neutral terminal N of power source 4.

Battery 8 can be a conventional array of rechargeable wet cells having a positive output terminal (+) and a negative output terminal (−). Battery charger 9 can be a conventional battery charger which includes rectifiers and regulators for converting AC power received at its input terminals 110 B and N to a DC current which is delivered to its output terminals (+) and (−).

Inverter means 7 which can take many forms converts DC power received at its input terminals (+) and (−) from battery 8 to 60-cycle AC power delivered from its output terminals 110 and N when transfer control means 5 closes a path between the control terminals T1 and T2. A preferred inverter means 7 is shown in FIG. 2 comprising relay R1 which controls the energization of transistor oscillator circuit OSC having an output transformer T. The oscillator circuit is such that when a DC voltage is applied across its input terminals it immediately breaks into oscillation. The circuit can be of the master-oscillator power-amplifier type or power oscillator type which generates 60-cycle sinusoids, or of the free-running relaxation oscillator generating square waves which drives a tuned power amplifier for convering the square waves to essentially sinusoids. When transistors are used as the active elements of the oscillator circuit the input terminals thereof are effectively connected across the emitter-collector circuits of the transistors so that the DC power from battery 8 provides the operating power for the oscillators and amplifiers.

The transfer control means 5 is shown in FIG. 3 centered around two relays R2 and R3. The coils L2 and L3 of relays R2 and R3 are respectively connected across terminals 11 and 12 to receive alternating current from AC power source 4. When such current is present the relays are energized with their contacts in the positions shown in FIG. 3. Associated with relay R2 are two sets of contacts 1K2. and 2K2. The movable contact of set 1K2 is connected via terminal 13 to the (+) terminal of battery charger 9 (see FIG. 1) while the fixed contact is connected via terminal 14 to the (+) terminal of battery 8. The movable contact of set 2K2 is connected via terminal 16 to terminal T2 of inverter means 7, while the fixed contact is connected via terminal 15 to terminal T1 of inverter means 7.

Relay R3 has two contact sets 1K3 and 2K3. The upper fixed contact of set 2K3 is connected via terminal 17 to output 110 of inverter means 7 (see FIG. 1) as is the upper fixed contact of set 1K3. The movable contact of set 2K3 is connected via terminal 18 to one input 110 of alarm system 6 while the movable contact of set 1K3 is connected via terminal 19 to the other input 110 of the alarm system 6. The lower fixed contact of set 2K3 is connected via terminal 11 to output 110 B of AC power source 4 while lower fixed contact of set 1K3 is connected via terminal 20 to output 110 A of AC power source 4.

The operation of the apparatus will now be described. When AC power source 4 is operating alternating current is applied through terminals 11 and 12 energizing relays R2 and R3 of transfer control means 5 (FIG. 1 and 3). Contact set 1K2 connects terminals 13 and 14 connecting the (+) terminal of battery charger 9 to the (+) terminal of battery 8. Therefore, charger 9 is operatively connected to battery 8 and since charger 9 is receiving AC power from AC power source 4, battery 8 is being charged. Since contact set 2K2 is open inverter means 7 is not activated as will hereinafter become apparent. The contact set 2K3 connects terminal 18 to terminal 11, connecting terminal 110 B of AC power source 4 to one of the terminals 110 of AC alarm system 6. The contact set 1K3 connects terminal 19 to terminal 20, connecting terminal 110 A of source 4 to the other terminal 110 of alarm system 6. Therefore, AC alarm system receives its power from AC power source 4.

When AC power source 4 fails relays R2 and R3 drop out. The connection between terminals 13 and 14 opens, disconnecting battery charger 9 from battery 8. Contact set 2K2 closes connecting terminals 13 and 14 which connect terminal T1 to terminal T2 of inverter means 7. The shorting of terminals T1 and T2 connect the coil of relay R1 across terminals (+) and (−) of battery 8 (see FIG. 2). Relay R1 is energized and its contact set closes connecting terminals (+) and (−) of battery 8 to the inputs of transistor oscil-lator circuit OSC. Circuit OSC starts oscillating and delivers sixty cycle alternating current at the terminals 110 and N of the inverter means 7.

At the same time the contact sets 1K3 and 2K3 of relay R3 (FIG. 3) transfer. Terminal 17 is connected to terminal 18 and to terminal 19. Therefore, terminal 110 of inverter means 7 is connected to both terminals 110 of AC alarm system 6 and alarm system 6 is powered by inverter means 7. The situation remains in this state until AC power source 4 again delivers power. At that time the system returns to its initially described state.

It should be noted that by using transistorized oscillators in inverter means 7 the delivery of standby power is almost instantaneous preventing the possibility of false alarm generation.

What is claimed is:

1. Apparatus for supplying AC power to an AC load comprising AC input means for receiving AC power from AC power mains, a battery, a battery charger having an input connected to said AC input means and an output, a battery having terminals, an inverter means for converting DC power to AC power and having an input for receiving DC power and an output for transmitting AC power, said inverter means including a solid state oscillator means which is energized to generate AC power upon the receipt of DC power, a first controlled switching means normally connecting said AC input means to the AC load, and when switched opening such connection a second controlled switching means normally connected the output of said battery charger to the terminals of said battery and when switched opening such connection, a third controlled switching means which is normally open and when switched connecting the terminals of said battery to the input of said inverter means for energizing said solid state oscillator means, fourth controlled switching means which is normally open and when switched connecting the output of said inverter means to the AC load, and control means connected to said AC input means and operative in the absence of AC power on the AC power mains for switching each of said switching means.

2. The apparatus of claim 1 wherein said control means is the winding means of a relay means and each of said controlled switching means is a contact means of said relay means.

* * * * *